United States Patent [19]

Weiss

[11] Patent Number: 4,675,240

[45] Date of Patent: Jun. 23, 1987

[54] MAGNETIC RECORDING DISK USING SILICON SUBSTRATE

[75] Inventor: Joel R. Weiss, Morgan Hill, Calif.

[73] Assignee: International Business Machines Corporation, Armonk, N.Y.

[21] Appl. No.: 612,972

[22] Filed: May 23, 1984

Related U.S. Application Data

[63] Continuation of Ser. No. 443,515, Nov. 22, 1982, abandoned.

[51] Int. Cl.$^4$ .............................................. H01F 1/00
[52] U.S. Cl. ................................. 428/611; 204/192.2; 204/192.23; 428/64; 428/337; 428/457; 428/641; 428/661; 428/664; 428/667; 428/678; 428/681; 428/694; 428/900; 428/928

[58] Field of Search ................... 428/64, 65, 900, 694, 428/695, 611, 337, 457, 641, 661, 664, 667, 678, 681, 694, 928; 427/127–132, 48; 204/192 SP, 192 M

[56] References Cited

U.S. PATENT DOCUMENTS

| | | | |
|---|---|---|---|
| 3,515,606 | 6/1970 | Crowther | 156/3 |
| 3,787,237 | 1/1974 | Grungerg et al. | 117/240 |
| 4,330,582 | 5/1982 | Lindmayer | 428/64 |
| 4,376,963 | 3/1983 | Knoop et al. | 427/131 |

Primary Examiner—Bernard D. Pianalto
Attorney, Agent, or Firm—Henry E. Otto, Jr.

[57] ABSTRACT

A magnetic recording disk includes a silicon substrate which is extremely flat and essentially asperity-free. A nonmagnetic underlayer is deposited on the silicon to enhance the magnetic performance of the magnetic layer which is deposited on the underlayer. A protective nonmagnetic overlayer is deposited on the magnetic layer.

7 Claims, No Drawings

MAGNETIC RECORDING DISK USING SILICON SUBSTRATE

CROSS-REFERENCE TO RELATED APPLICATION

This is a continuation of application Ser. No. 443,515 filed Nov. 22, 1982, now abandoned.

Copending application Ser. No. 218,339, filed Dec. 19, 1980, now U.S. Pat. No. 4,376,963 discloses a magnetic recording structure comprising a silicon disk mounted in a core support member.

FIELD OF THE INVENTION

This invention relates in general to magnetic recording disks, and relates more particularly to such disks formed using a silicon substrate.

DESCRIPTION OF PRIOR ART

In magnetic recording, the use of disks having either particulate or thin film magnetic coatings on aluminum substrates is well known. Each of these types of coatings has problems associated therewith which render them less than totally desirable, particularly for extremely thin coatings which are required for high bit density recording patterns being used now and in the future.

Particulate magnetic coatings on aluminum substrates, especially in extremely thin layers, often exhibit limited durability with respect to contact with the magnetic transducer associated with the disk. Thin film magnetic disks, usually produced by sputtering, evaporation or electroplating of a magnetic coating on an aluminum substrate, generally provide magnetic coatings which are thinner than those available with particulate coatings. However, thin film disks often exhibit significant corrosion problems, primarily because of the reaction between the metal substrate, which has been required to be aluminum because of weight considerations, and the deposited thin film layer. Such disks have required the deposition of two or more protective layers between the substrate and the thin film magnetic layer and over the thin film layer. Understandably, the requirement for these protective layers has added significantly to the cost of the thin film disk. Additionally, both particulate and thin film magnetic disks usually have employed a substrate of substantial thickness relative to the coating thickness, thereby adding appreciably to the weight of an assembly which includes several of such disks.

Since thin films of metals or polymers typically replicate the substrate surface, the necessity to try to achieve surface perfection (i.e., asperity free, flat, etc., to prevent amplitude modulation and head crashes) in aluminum substrates has been a traditional problem. While improvements in substrate polishing and coatings have been made, future major performance improvements will rely on enhancements of the substrate surface.

The above-identified related application shows the use of silicon for a magnetic recording disk substrate, but that structure requires a reinforcing core member to support the silicon substrate.

SUMMARY OF THE INVENTION

In accordance with the present invention, a magnetic recording disk is formed on a single crystal silicon substrate by first vapor depositing a layer of material on the silicon to enhance the magnetic performance and adhesion of a subsequently applied magnetic layer. The magnetic layer may have applied thereto a thin protective overcoating layer. The reinforcing core is not required for this invention.

DESCRIPTION OF THE PREFERRED EMBODIMENT

In accordance with the present invention, single crystal silicon substrates can be produced by cutting conventional silicon boules which are readily available in the semiconductor industry. The substrates may be sliced from a boule by any suitable technique. Such boules are now available in diameters greater than six inches. The substrate wafers may be cut to a suitable thickness such as the range from 0.017 to 0.032 inches and polished on botn surfaces. The surface of these single crystal silicon substrates have been found to be exceptionally flat and essentially asperity-free (i.e. smooth). Prior to application of any coating to the silicon substrates, a central opening is preferably provided in the substrate to permit the finished magnetic recording disk to be clamped to a suitable structure for rotating. Such opening may be generated by laser cutting or diamond core drilling for example.

After the initial fabrication of the single crystal silicon substrate, an undercoating is applied by RF sputtering to both surfaces of the substrate. This undercoat is preferably Cr which is sublimed/evaporated to a thickness of approximately 4500 Å. It has been found that the deposition of this undercoat on the silicon surface results in an enhancement of the magnetic properties of the overlying magnetic layer and that this magnetic enhancement does not occur when Cr is similarly deposited as an undercoat on substrates other than silicon, such as AlMg.

Following deposition of the undercoating, the magnetic layer may be applied, again by RF sputtering. The magnetic layer can be of a suitable type such as the Fe:Co:Cr magnetic layer described in U.S. Pat. No. 4,245,008. As taught in that patent, the magnetic layer consists essentially of, in weight percentage, from 0-55% Co, from 8-22% Cr, with the remainder being mainly iron. Such a magnetic layer can be deposited to a thickness of approximately 300 Å by RF sputttering.

It has been found that magnetic films produced as described above have excellent and unexpectedly good magnetic properties including coercivities ranging from 300 to 1000 oersteds, and magnetic squareness values approximately greater than 90%. Alternatively, magnetic layers of sputtered CoCr have produced excellent magnetic properties.

As an alternate to the Fe, Co, Cr magnetic layer taught in U.S. Pat. No. 4,245,008, other magnetic layers may be employed. For example, a layer of $Fe_3O_4$ may be RF sputtered and converted in place by oxidation to magnetic $Fe_2O_3$. A suitable overcoat layer is provided to protect the magnetic layer, and such overcoat layer may be a hard, durable ceramic, polymeric or metallic film sufficiently thin so as not to degrade the magnetic characteristics of the magnetic layer.

One particularly attractive protective overcoat layer has been found to be formed by monolayers of 70 Å diameter $SiO_2$ beads plus 50 Å–100 Å of amorphous $SiO_2$ applied by a precipitation process.

If desired, a lubricant material may be applied to the surface of the protective overcoat layer to facilitate the "flying" of a transducer in close air bearing relationship to the rotating disk surface without deleterious contact between the transducer and the disk surface.

I claim:

1. A rotatable magnetic recording disk comprising:
    a thin silicon substrate consisting essentially of single crystal silicon, having at least one flat surface that is essentially asperity-free;
    a magnetic layer on at least one such flat surface of said substrate;
    a nonmagnetic underlayer interposed between and in contact with each magnetic layer and the substrate to enhance adhesion of the magnetic layer to said flat surface and enhance magnetic performance of the magnetic layer; and
    said silicon substrate constituting the sole support for said layers and any others constituting said magnetic recording disk.

2. A magnetic recording disk in accordance with claim 1, including a hard nonmagnetic protective overcoat layer covering each magnetic layer.

3. A magnetic recording disk according to claim 1, wherein said silicon substrate haas a thickness not exceeding about 0.032 inch.

4. A magnetic recording disk according to claim 1, wherein said nonmagnetic underlayer comprises Cr.

5. A rotatable magnetic recording disk consisting of:
    a thin silicon substrate consisting essentially of single crystal silicon, having at least one flat surface that is essentially smooth;
    a magnetic layer applied to at least one such flat surface;
    a nonmagnetic Cr-containing underlayer interposed between and in contact with each magnetic layer and the substrate to enhance adhesion of said magnetic layer to such associated flat surface and enhance magnetic performance of the associated magnetic layer;
    a hard nonmagnetic protective overcoat layer covering each magnetic layer; and
    said silicon substrate constituting the sole support for said layers constituting said magnetic recording disk.

6. A magnetic recording disk according to claim 5, wherein said silicon substrate has a thickness not exceeding about 0.032 inch.

7. A magnetic recording disk in accordance with claim 5, in which said nonmagnetic underlayer is sputtered Cr and in which said magnetic layer is sputtered Fe:Co:Cr.

* * * * *